(12) United States Patent
Gkinosatis

(10) Patent No.: US 9,604,430 B2
(45) Date of Patent: Mar. 28, 2017

(54) THIN FILM FOR WASTE PACKING CASSETTES

(71) Applicant: Flexopack S.A., Koropi (GR)

(72) Inventor: Dimitris Gkinosatis, Koropi Attica (GR)

(73) Assignee: FLEXOPACK S.A., Koropi (GR)

( * ) Notice: Subject to any disclaimer, the term of this patent is extended or adjusted under 35 U.S.C. 154(b) by 0 days.

(21) Appl. No.: 13/722,323

(22) Filed: Dec. 20, 2012

(65) Prior Publication Data

US 2013/0209797 A1    Aug. 15, 2013

(30) Foreign Application Priority Data

Feb. 8, 2012 (EP) ..................... 12154500

(51) Int. Cl.
*B32B 5/00* (2006.01)
*B32B 27/32* (2006.01)

(52) U.S. Cl.
CPC ............... *B32B 5/00* (2013.01); *B32B 27/32* (2013.01); *B32B 2250/24* (2013.01); *B32B 2307/7244* (2013.01); *B32B 2307/7248* (2013.01); *Y10T 428/27* (2015.01)

(58) Field of Classification Search
None
See application file for complete search history.

(56) References Cited

U.S. PATENT DOCUMENTS

| | | | |
|---|---|---|---|
| 2,380,054 A | 8/1943 | Lautmann | |
| 2,376,185 A | 5/1945 | Randall | |
| 3,214,884 A | 11/1965 | Langdon | |
| 3,299,194 A | 1/1967 | Golike | |
| 3,356,192 A | 12/1967 | Cameron | |
| 3,456,044 A | 7/1969 | Pahlke | |
| 3,846,569 A | 11/1974 | Kaplan | |
| 3,908,336 A | 9/1975 | Forslund | |
| 3,956,229 A | 5/1976 | Bollen et al. | |
| 4,064,296 A | 12/1977 | Bornstein et al. | |
| 4,207,363 A * | 6/1980 | Lustig ............ | B32B 27/32 426/129 |
| 4,207,364 A | 6/1980 | Nyberg | |
| 4,254,869 A | 3/1981 | Heier | |
| 4,362,834 A | 12/1982 | Lefevre et al. | |
| 4,399,181 A | 8/1983 | Yoshimura et al. | |
| 4,595,433 A | 6/1986 | Ford et al. | |
| 4,612,221 A | 9/1986 | Biel et al. | |
| 4,650,721 A | 3/1987 | Ashcraft et al. | |
| 4,705,707 A | 11/1987 | Winter | |
| 4,716,061 A | 12/1987 | Winter | |
| 4,786,561 A | 11/1988 | Fong | |
| 4,801,486 A | 1/1989 | Quacquarella et al. | |
| 4,857,399 A | 8/1989 | Vicik | |
| 4,863,769 A | 9/1989 | Lustig et al. | |
| 4,869,049 A | 9/1989 | Richards et al. | |
| 4,911,979 A | 3/1990 | Nishimoto et al. | |
| 4,912,149 A | 3/1990 | Robeson et al. | |
| 4,934,529 A | 6/1990 | Richards et al. | |
| 4,941,310 A | 7/1990 | Kristen | |
| 4,976,898 A | 12/1990 | Lustig et al. | |
| 4,977,022 A | 12/1990 | Mueller | |
| 4,990,562 A | 2/1991 | Chou et al. | |
| 5,001,192 A | 3/1991 | Sun | |
| 5,034,281 A | 7/1991 | Kawasaki et al. | |
| 5,079,051 A | 1/1992 | Garland et al. | |
| 5,169,708 A | 12/1992 | Amaral et al. | |
| 5,179,168 A | 1/1993 | Hirasawa | |
| 5,256,351 A | 10/1993 | Lustig et al. | |
| 5,256,428 A | 10/1993 | Lustig et al. | |
| 5,296,580 A | 3/1994 | Matsunaga et al. | |
| 5,298,202 A | 3/1994 | Schirmer | |
| 5,302,402 A | 4/1994 | Dudenhoeffer et al. | |
| 5,382,470 A | 1/1995 | Vicik | |
| 5,397,613 A | 3/1995 | Georgelos | |
| 5,562,958 A | 10/1996 | Walton et al. | |
| 5,593,747 A | 1/1997 | Georgelos | |
| 5,645,788 A | 7/1997 | Bekele | |
| 5,698,279 A | 12/1997 | Vicik | |
| 5,834,077 A | 11/1998 | Babrowicz | |
| 5,837,335 A | 11/1998 | Babrowicz | |
| 5,851,610 A | 12/1998 | Ristey et al. | |
| 5,888,615 A | 3/1999 | Mascarenhas et al. | |
| 5,983,607 A | 11/1999 | Mihalov et al. | |
| 6,013,378 A | 1/2000 | White et al. | |
| 6,058,998 A | 5/2000 | Kristen | |
| 6,065,272 A | 5/2000 | Lecomte | |
| 6,074,715 A | 6/2000 | Lind et al. | |
| 6,088,996 A | 7/2000 | Maruyama | |

(Continued)

FOREIGN PATENT DOCUMENTS

AU   511 195 B2   7/1980
EP   0 005 660   11/1979

(Continued)

OTHER PUBLICATIONS

Interview Summary corresponding to U.S. Appl. No. 11/801,609 dated Jul. 31, 2012.
Official Action corresponding to U.S. Appl. No. 12/150,168 dated Aug. 14, 2012.
Official Action corresponding to U.S. Appl. No. 12/319,149 dated Aug. 27, 2012.
Official Action corresponding to U.S. Appl. No. 12/319,150 dated Mar. 14, 2013.
Official Action corresponding to U.S. Appl. No. 12/957,947 dated Jan. 17, 2012.
Official Action corresponding to U.S. Appl. No. 12/957,947 dated Sep. 25, 2012.
Unisource—Moisture Barrier & Oxygen Barrier Transmission Rates; <http://www.unisourcelink.com/packaging/pdf/MoistureBarrier.pdf> (Retrieved on Jan. 10, 2012).
"Baymod L 2450," Product Data Sheet, LANXESS. (2 pages) (2007).
"Elvaloy resins," Product Data Sheet, DuPont Packaging & Industrial Polymers. (2 pages) (2010).

(Continued)

*Primary Examiner* — Sheeba Ahmed
(74) *Attorney, Agent, or Firm* — Jenkins, Wilson, Taylor & Hunt

(57) ABSTRACT

The present invention refers to a polymeric film comprising an odor barrier material and being able to pack malodorous waste.

16 Claims, No Drawings

(56) References Cited

U.S. PATENT DOCUMENTS

| | | | |
|---|---|---|---|
| 6,146,726 A | 11/2000 | Yoshii et al. |
| 6,221,410 B1 | 4/2001 | Ramesh et al. |
| 6,258,423 B1 | 7/2001 | Giori |
| 6,274,246 B1 | 8/2001 | Eggers et al. |
| 6,299,984 B1 | 10/2001 | Forloni |
| 6,346,285 B1 | 2/2002 | Ramesh |
| 6,406,763 B1 | 6/2002 | Wolf et al. |
| 6,458,437 B1 | 10/2002 | Ito et al. |
| 6,506,463 B1 | 1/2003 | Cahill et al. |
| 6,514,583 B1 | 2/2003 | Ahlgren et al. |
| 6,516,588 B2 | 2/2003 | Jensen et al. |
| 6,531,198 B2 | 3/2003 | Lind et al. |
| 6,534,137 B1 | 3/2003 | Vadhar |
| 6,558,760 B1 | 5/2003 | Paleari et al. |
| 6,572,959 B1 | 6/2003 | Buongiorno et al. |
| 6,592,975 B1 | 7/2003 | Ueyama et al. |
| 6,610,046 B1 | 8/2003 | Usami et al. |
| 6,663,905 B1 | 12/2003 | Ennis et al. |
| 6,682,792 B2 | 1/2004 | Schmal et al. |
| 6,777,046 B1 | 8/2004 | Tatarka et al. |
| 6,869,686 B1 | 3/2005 | Idlas |
| 6,960,635 B2 | 11/2005 | Stevens et al. |
| 6,984,695 B2 | 1/2006 | Brown et al. |
| 7,473,473 B2 | 1/2009 | Verrocchi |
| 7,611,770 B2 | 11/2009 | Kennedy et al. |
| 7,736,726 B2 | 6/2010 | McAllister et al. |
| 8,129,006 B2 | 3/2012 | Ginossatis |
| 8,697,211 B2 | 4/2014 | Gkinosatis |
| 9,290,320 B2 | 3/2016 | Gkinosatis |
| 9,365,687 B2 | 6/2016 | Gkinosatis |
| 2002/0038535 A1 | 4/2002 | Jensen et al. |
| 2002/0066261 A1 | 6/2002 | Richards |
| 2002/0119334 A1 | 8/2002 | Shepard et al. |
| 2002/0172834 A1 | 11/2002 | Rivett et al. |
| 2003/0008084 A1* | 1/2003 | Vicik et al. ............. 428/34.8 |
| 2003/0012900 A1 | 1/2003 | Wolf et al. |
| 2003/0073785 A1 | 4/2003 | Okada et al. |
| 2003/0124452 A1 | 7/2003 | Nair et al. |
| 2003/0213804 A1 | 11/2003 | Chomik et al. |
| 2003/0218022 A1 | 11/2003 | Chomik et al. |
| 2003/0220453 A1 | 11/2003 | Ebara et al. |
| 2004/0020175 A1 | 2/2004 | Stravitz |
| 2004/0020913 A1 | 2/2004 | Hovorka |
| 2004/0043238 A1 | 3/2004 | Wuest et al. |
| 2004/0048086 A1 | 3/2004 | Kennedy et al. |
| 2004/0065052 A1 | 4/2004 | Ramesh et al. |
| 2004/0074904 A1 | 4/2004 | Share et al. |
| 2004/0157077 A1 | 8/2004 | Roussos |
| 2004/0159972 A1 | 8/2004 | Koschmieder et al. |
| 2004/0194433 A1 | 10/2004 | Chomik et al. |
| 2005/0044819 A1 | 3/2005 | Chomik et al. |
| 2005/0064123 A1 | 3/2005 | Chomik et al. |
| 2005/0129811 A1 | 6/2005 | Kraimer et al. |
| 2005/0147778 A1 | 7/2005 | Tai et al. |
| 2005/0191439 A1 | 9/2005 | Hirose et al. |
| 2005/0235611 A1 | 10/2005 | Roussos |
| 2005/0239961 A1 | 10/2005 | Saraf et al. |
| 2005/0271877 A1 | 12/2005 | Ginossatis |
| 2006/0010837 A1 | 1/2006 | Jurus |
| 2006/0172143 A1 | 8/2006 | Breese et al. |
| 2006/0177616 A1 | 8/2006 | Barber et al. |
| 2006/0177641 A1 | 8/2006 | Breese et al. |
| 2006/0199030 A1 | 9/2006 | Liang et al. |
| 2006/0199912 A1 | 9/2006 | Fuchs et al. |
| 2006/0254219 A1 | 11/2006 | Alipour et al. |
| 2006/0272767 A1 | 12/2006 | Kreitman et al. |
| 2006/0283153 A1 | 12/2006 | Nakano |
| 2006/0286323 A1 | 12/2006 | Siegel et al. |
| 2007/0042089 A1 | 2/2007 | Grah |
| 2007/0082150 A1 | 4/2007 | Ginossatis |
| 2007/0089688 A1 | 4/2007 | Nitzsche et al. |
| 2007/0178285 A1 | 8/2007 | Rasanen et al. |
| 2008/0003332 A1 | 1/2008 | Ginossatis |
| 2008/0070047 A1 | 3/2008 | Rehkugler et al. |
| 2008/0095960 A1 | 4/2008 | Schell et al. |
| 2008/0115463 A1 | 5/2008 | Wilson |
| 2008/0255311 A1 | 10/2008 | Chang et al. |
| 2008/0274314 A1 | 11/2008 | Gkinosatis |
| 2008/0274328 A1 | 11/2008 | Gkinosatis |
| 2008/0305220 A1 | 12/2008 | Gkinosatis |
| 2009/0013656 A1 | 1/2009 | Nasiatka et al. |
| 2009/0176117 A1 | 7/2009 | Gkinosatis |
| 2009/0191392 A1* | 7/2009 | Gkinosatis ............. 428/219 |
| 2009/0196962 A1 | 8/2009 | Gkinosatis |
| 2009/0240227 A1 | 9/2009 | Toro et al. |
| 2009/0263599 A1 | 10/2009 | Gkinosatis |
| 2010/0028574 A1 | 2/2010 | Gkinosatis |
| 2010/0032098 A1 | 2/2010 | Lalli et al. |
| 2010/0034939 A1 | 2/2010 | Gkinosatis |
| 2011/0159263 A1* | 6/2011 | Gkinosatis ............. 428/219 |
| 2012/0279181 A1 | 11/2012 | Gkinosatis |
| 2012/0289645 A1 | 11/2012 | Tice et al. |
| 2013/0019568 A1 | 1/2013 | Gkinosatis |
| 2013/0227916 A1 | 9/2013 | Gkinosatis |
| 2015/0010764 A1 | 1/2015 | Gkinosatis |
| 2015/0210454 A1 | 7/2015 | Gkinosatis |
| 2016/0176612 A1 | 6/2016 | Ginosatis |

FOREIGN PATENT DOCUMENTS

| | | |
|---|---|---|
| EP | 0 286 407 | 10/1988 |
| EP | 0 402 043 | 12/1990 |
| EP | 0 472 418 | 2/1992 |
| EP | 0 627 465 | 12/1994 |
| EP | 0 810 087 | 12/1997 |
| EP | 1 072 632 A2 | 1/2001 |
| EP | 0 930 349 B1 | 6/2003 |
| EP | 1 060 077 | 6/2003 |
| EP | 1 131 205 | 12/2004 |
| EP | 1 514 680 A1 | 3/2005 |
| EP | 1 415 930 | 4/2006 |
| EP | 1 770 116 A1 | 4/2007 |
| EP | 1 854 625 A1 | 11/2007 |
| EP | 08162162.5 | 8/2008 |
| EP | 1 985 440 A2 | 10/2008 |
| EP | 1 985 443 A2 | 10/2008 |
| EP | 1 995 058 A1 | 11/2008 |
| EP | 2 077 239 A2 | 7/2009 |
| EP | 2 077 297 A1 | 7/2009 |
| EP | 2 085 216 A1 | 8/2009 |
| EP | 2 111 979 A2 | 10/2009 |
| EP | 2 147 783 A1 | 1/2010 |
| GB | 792290 | 3/1958 |
| GB | 1 140 765 | 1/1969 |
| GB | 2 236 531 | 4/1991 |
| JP | 62107810 A | 5/1987 |
| JP | 03 200534 | 9/1991 |
| JP | 07196818 | 8/1995 |
| JP | 07206004 | 8/1995 |
| JP | 07206005 | 8/1995 |
| JP | 07206006 | 8/1995 |
| JP | 2002-234975 | 8/2002 |
| JP | 2003-159761 | 6/2003 |
| JP | 2005-047959 | 2/2005 |
| JP | 2005-335111 | 12/2005 |
| JP | 2006-247870 | 9/2006 |
| NZ | 567768 | 11/2009 |
| NZ | 567767 | 5/2010 |
| WO | WO96/01736 | 1/1996 |
| WO | WO 97/12758 | 4/1997 |
| WO | WO97/46384 | 12/1997 |
| WO | WO98/21274 | 5/1998 |
| WO | WO98/21276 | 5/1998 |
| WO | WO99/44824 | 9/1999 |
| WO | WO99/57612 | 11/1999 |
| WO | WO00/61439 | 10/2000 |
| WO | WO01/23268 | 4/2001 |
| WO | WO02/26493 | 4/2002 |
| WO | WO03/020515 | 3/2003 |
| WO | WO 2006/053885 | 5/2006 |
| WO | WO2006/075141 | 7/2006 |
| WO | WO2006/102152 | 9/2006 |
| WO | WO2007/053603 | 5/2007 |

(56) References Cited

FOREIGN PATENT DOCUMENTS

| | | |
|---|---|---|
| WO | WO2008/091321 | 7/2008 |
| WO | WO2008/118554 | 10/2008 |
| WO | WO 2011/029597 | 3/2011 |

OTHER PUBLICATIONS

Interview Summary corresponding to U.S. Appl. No. 12/319,150 dated Sep. 6, 2013.
Official Action corresponding to U.S. Appl. No. 12/957,947 dated Jul. 24, 2013.
"15.13xEA—Ethylene Vinyl Acetate (EVA) Copolymers (>50% Ethylene)—European Adhesives," The ChemQuest Group, Inc. http://web.archive.org/web/20080219220919/http://www.chemquest.com/store/ethylene-vinyl-acetate-copolymers-european-adhesives.html (Aug. 26, 2011) (2 pages).
"DuPont™ Elvax® 3170," DuPont Packaging & Industrial Polymers. 3 pages (2004) http://web.archive.org/web/20060516114601/http://www2.dupont.com/Elvax/en_US/assets/downloads/vax3170.pdf.
"Polybutylene terephthalate," Britannica Online Encyclopedia. pp. 1-3 (Accessed on Sep. 7, 2011) <http://www.britannica.com/EBchecked/topic/468341/polybuylene-terephthalate-PBT>.
"Polybutylene terephthalate (PBT)," 1 page <http://www.britannica.com/EBchecked/topic/468341/polybutylene-terephthalate-PBT> (Accessed on Jun. 13, 2012).
"Polymer Blend," IUPAC Compendium of Chemical Terminology. 2nd Edition (1997).
Annonymous, "Advantages of metallocene ethylene [olymer resins in multilayer stretch films," Research Disclosure, Mason Publications, Hampshire, GB. vol. 419, No. 26 (1999).
Annonymous, "Some benefits from the use of metallocene ethylene polymers in blown and cast films," Research Disclosure, Mason Publications, Hampshire, GB. vol. 392, No. 54 (1996).
ASTM D 882-09. Standard Test Method for Tensile Properties of Thin Plastic Sheeting. American National Standards Institute. Jan. 2009. www.astm.org.
ASTM D 1003-07 "Haze and Luminous Transmittance of Transparent Plastics," ASTM International. pp. 1-7.
ASTM D 1525-07 "Vicat Softening Temperature of Plastics," ASTM International. pp. 1-9.
ASTM D 2732-03 "Unrestrained Linear Thermal Shrinkage of Plastic Film and Sheeting," ASTM International. pp. 1-5.
ASTM D 3418-08. Standard Test Method for Transition Temperatures and Enthalpies of Fusion and Crystallization of Polymers by Differential Scanning Calorimetry. American National Standards Institute. Dec. 2008. www.astm.org.
ASTM D 3985. Standard Test Method for Oxygen Gas Transmission Rate Through Plastic Film and Sheeting Using a Coulometric Sensor. American National Standards Institute. pp. 1-7. www.astm.org.
ASTM F 1927-07. Standard Test Method for Determination of Oxygen Gas Transmission Rate, Permeability and Permeance at Controlled Relative Humidity Through Barrier Materials Using a Coulometric Detector. American National Standards Institute. Aug. 2007. www.astm.org.
BS 2782-0:2004 "Methods of Testing Plastics," British Standards Institution. pp. 1-29 (2004).
English abstract of JP 2005-103902, USUI, Apr. 2005.
European Search Report corresponding to European Patent Application No. 08173056.6-2109 dated Mar. 16, 2009.
European Search Report corresponding to European Patent Application No. 08173057.4-2307 dated Sep. 22, 2009.
Extended European Search Report corresponding to European Patent Application No. 05021541.7-2115 dated Dec. 2, 2005.
Extended European Search Report corresponding to European Patent Application No. 08154742.4-2124 dated Jul. 2, 2009.
Extended European Search Report corresponding to European Patent Application No. 08156814 dated Oct. 9, 2008.
Extended European Search report corresponding to European Patent Application No. 09151289.7-2124 dated Jun. 8, 2009.
Extended European Search Report corresponding to European Patent Application No. 10193414.9-1217 dated May 9, 2011.
Harper, "Modern Plastics Handbook," McGraw-Hill: New York, New York. pp. 3.17-3.22 (2000).
Hough, M., and Dolbey, R., "Modern Plastics Compendium, vol. 1—Key Properties and Sources," Smithers Rapra Technology. pp. 87-124 (1995).
Huskić, M., and Šebenik, A., "Characterization of Crosslinked Ethylene-Vinylacetate Copolymers," Polymer International. vol. 31, No. 1 pp. 41-44 (1993).
Interview Summary corresponding to U.S. Appl. No. 12/150,261 dated Dec. 28, 2010.
Interview Summary corresponding to U.S. Appl. No. 12/150,261 dated Sep. 21, 2011.
Interview Summary corresponding to U.S. Appl. No. 12/150,261 dated Jun. 12, 2012.
Interview Summary corresponding to U.S. Appl. No. 12/319,149 dated Oct. 17, 2011.
Interview Summary corresponding to U.S. Appl. No. 12/319,149 dated Jun. 15, 2012.
Interview Summary corresponding to U.S. Appl. No. 12/319,150 dated Sep. 23, 2011.
Interview Summary corresponding to U.S. Appl. No. 12/322,347 dated Sep. 21, 2011.
Interview Summary corresponding to U.S. Appl. No. 12/508,233 dated Apr. 26, 2012.
Kipp, "Plastic Material Data Sheets," MatWeb (2004) (5 pages).
Machine Translation of JP 2005-103902, USUI, Apr. 2005.
Notice of Allowance corresponding to U.S. Appl. No. 11/528,741 dated Oct. 28, 2011.
Official Action corresponding to U.S. Appl. No. 11/528,741 dated Mar. 30, 2010.
Official Action corresponding to U.S. Appl. No. 11/528,741 dated Jan. 4, 2011.
Official Action corresponding to U.S. Appl. No. 11/528,741 dated May 18, 2011.
Official Action corresponding to U.S. Appl. No. 11/801,609 dated Sep. 15, 2009.
Official Action corresponding to U.S. Appl. No. 11/801,609 dated Feb. 5, 2010.
Official Action corresponding to U.S. Appl. No. 11/801,609 dated Jul. 15, 2010.
Official Action corresponding to U.S. Appl. No. 11/801,609 dated Jun. 20, 2011.
Official Action corresponding to U.S. Appl. No. 11/801,609 dated Jan. 30, 2012.
Official Action corresponding to U.S. Appl. No. 12/150,168 dated Feb. 16, 2011.
Official Action corresponding to U.S. Appl. No. 12/150,168 dated Sep. 23, 2011.
Official Action corresponding to U.S. Appl. No. 12/150,261 dated Oct. 27, 2009.
Official Action corresponding to U.S. Appl. No. 12/150,261 dated Jul. 7, 2010.
Official Action corresponding to U.S. Appl. No. 12/150,261 dated Mar. 22, 2011.
Official Action corresponding to U.S. Appl. No. 12/150,261 dated Jan. 31, 2012.
Official Action corresponding to U.S. Appl. No. 12/154,662 dated Mar. 29, 2011.
Official Action corresponding to U.S. Appl. No. 12/154,662 dated Aug. 18, 2011.
Official Action corresponding to U.S. Appl. No. 12/154,662 dated Jan. 18, 2012.
Official Action corresponding to U.S. Appl. No. 12/319,149 dated Oct. 15, 2009.
Official Action corresponding to U.S. Appl. No. 12/319,149 dated Jul. 7, 2010.
Official Action corresponding to U.S. Appl. No. 12/319,149 dated Mar. 22, 2011.

(56) References Cited

OTHER PUBLICATIONS

Official Action corresponding to U.S. Appl. No. 12/319,149 dated Dec. 2, 2011.
Official Action corresponding to U.S. Appl. No. 12/319,150 dated Oct. 15, 2010.
Official Action corresponding to U.S. Appl. No. 12/319,150 dated Apr. 26, 2011.
Official Action corresponding to U.S. Appl. No. 12/319,150 dated Nov. 4, 2011.
Official Action corresponding to U.S. Appl. No. 12/322,347 dated Sep. 14, 2010.
Official Action corresponding to U.S. Appl. No. 12/322,347 dated Mar. 16, 2011.
Official Action corresponding to U.S. Appl. No. 12/322,347 dated Oct. 26, 2011.
Official Action corresponding to U.S. Appl. No. 12/322,347 dated May 15, 2012.
Official Action corresponding to U.S. Appl. No. 12/426,496 dated Feb. 7, 2012.
Official Action corresponding to U.S. Appl. No. 12/508,233 dated Mar. 9, 2011.
Official Action corresponding to U.S. Appl. No. 12/508,233 dated Nov. 23, 2011.
Official Action corresponding to U.S. Appl. No. 12/508,233 dated Jun. 6, 2012.
Official Action corresponding to U.S. Appl. No. 12/512,361 dated Aug. 31, 2011.
Official Action corresponding to U.S. Appl. No. 12/512,361 dated May 2, 2012.
Petrie, "Handbook of Adhesives and Sealants," $2^{nd}$ Edition. McGraw-Hill: New York, New York. pp. 465-466 (2007).
Search Report corresponding to French Patent Application No. 1059997 dated Jan. 16, 2012.
Official Action corresponding to U.S. Appl. No. 12/150,168 dated Apr. 26, 2013.
"Filling and sealing of containers" in Fellows, P.J. (2000). Food Processing Technology—Principles and Practice (2nd Edition). Woodhead Publishing.
Advisory Action corresponding to U.S. Appl. No. 12/319,150 dated Nov. 13, 2013.
Notice of Allowance corresponding to U.S. Appl. No. 12/150,168 dated Nov. 25, 2013.
Official Action corresponding to New Zealand Patent Application No. 626181 dated Jun. 18, 2014.
Official Action corresponding to United Kingdom Patent Application No. GB1020302.4 dated Jul. 2, 2014.
Official Action corresponding to U.S. Appl. No. 13/157,876 dated Nov. 19, 2013.
Official Action corresponding to U.S. Appl. No. 11/801,609 dated Nov. 29, 2013.
Official Action corresponding to U.S. Appl. No. 12/957,947 dated Apr. 24, 2014.
Official Action corresponding to U.S. Appl. No. 13/157,876 dated Jun. 2, 2014.
Official Action corresponding to U.S. Appl. No. 12/322,347 dated Aug. 1, 2014.
Official Action corresponding to U.S. Appl. No. 11/801,609 dated Sep. 24, 2014.
Official action corresponding to European Patent Application No. 10 193 414.9-1303 dated Oct. 29, 2014.
Official Action corresponding to United Kingdom Patent Application No. GB1020302.4 dated Dec. 11, 2014.
Official Action corresponding to U.S. Appl. No. 12/957,947 dated Jan. 7, 2015.
Official Action corresponding to U.S. Appl. No. 13/523,462 dated Jan. 30, 2015.
Official Action corresponding to U.S. Appl. No. 13/157,876 dated Mar. 3, 2015.
Official Action corresponding to U.S. Appl. No. 12/322,347 dated May 20, 2015.
Official Action corresponding to U.S. Appl. No. 11/801,609 dated Jun. 12, 2015.
Official Action corresponding to U.S. Appl. No. 13/682,160 dated Jun. 15, 2015.
Notice of Allowance corresponding to U.S. Appl. No. 13/157,876 dated Nov. 12, 2015.
Official Action corresponding to U.S. Appl. No. 11/801,609 dated Feb. 2, 2016.
Official Action corresponding to U.S. Appl. No. 12/319,150 dated Jul. 22, 2015.
Official Action corresponding to U.S. Appl. No. 12/957,947 dated Sep. 16, 2015.
Official Action corresponding to U.S. Appl. No. 13/523,462 dated Sep. 21, 2015.
Official Action corresponding to U.S. Appl. No. 13/682,160 dated Jan. 29, 2016.
Official Action corresponding to U.S. Appl. No. 14/612,175 dated Dec. 9, 2015.
Advisory Action corresponding to U.S. Appl. No. 11/801,609 dated Jun. 16, 2016.
Notice of Allowance correspoding to U.S. Appl. No. 12/319,150 dated Feb. 12, 2016.
Notice of Allowance corresponding to U.S. Appl. No. 13/523,462 dated May 16, 2016.
Official Action corresponding to U.S. Appl. No. 12/322,347 dated Feb. 18, 2016.
Official Action corresponding to U.S. Appl. No. 12/957,947 dated Mar. 31, 2016.
Official Action corresponding to U.S. Appl. No. 13/682,160 dated Jun. 30, 2016.
Office Action corresponding U.S. Appl. No. 14/304,101 dated Jun. 30, 2016.
"Polymer Materials Selection for Radiation-Sterilized Products." <http://www.mddionline.com/article/polymer-materials-selection-radiation-sterilized-products> dated Feb. 1, 2000.
Advisory Action, Examiner Initiated Interview Summary, and AFCP 2.0 Decision corresponding to U.S. Appl. No. 14/612,175 dated Jan. 4, 2017.
Interview Summary corresponding to U.S. Appl. No. 13/682,160 dated Oct. 28, 2016.
Notice of Decision form Post-Prosectuion Pilot Program (P3) Conference corresponding to U.S. Appl. No. 12/957,947 dated Dec. 14, 2016.
Official Action corresponding to U.S. Appl. No. 11/801,609 dated Nov. 16, 2016.
Official Action corresponding to U.S. Appl. No. 14/304,101 dated Dec. 9, 2016.

\* cited by examiner

THIN FILM FOR WASTE PACKING CASSETTES

The present U.S. patent application claims priority to European Patent Application No. 12 154 500.8, filed Feb. 8, 2012, the disclosure of which is incorporated herein by reference in its entirety.

The present invention refers to a polymeric film comprising an odor barrier material and being able to pack malodorous waste.

A lot of waste products produce smells that are annoying to the environment. Examples are decayed food, kid nappies and cat litter.

In the prior art there are many films that could be used for protection from malodors. As well known in the art, the use of materials like EVOH, PVDC, polyacrylonitrile is recommended in order to not allow malodors escape from the container (e.g. bag or other configuration) and create an unpleasant atmosphere.

There are also a lot of known configurations of packing a certain length of film (e.g. 20 meters) in a compressed form (e.g. in a cassette). Examples of the representative cassettes are shown in U.S. Pat. No. 4,934,529 or U.S. Pat. No. 3,356,192.

Generally the cassette comprises a tubular core, casing wall and cassette bottom. The film is pulled through the area between the lid of the cassette and the casing wall. The flexible tubing is dispensed from the cassette. After the malodorous item (e.g. diaper) is thrown into the bag the core is rotated and the flexible tube is twisted so that it closes as hermetically as possible the waste/environment area.

To dispose the next diaper the user pushes the next portion of film. The previous hermetically closed diaper is pushed downwards and the new diaper is packed in a new configuration. All these different packs are stored in a bin which is periodically emptied. Separation of one pack to the other can be done by various means. A rotary knife is preferred.

Recently other methods of packing waste have been emerged such as the use of adhesive films. In prior art patent application US2008/0115463 use of adhesive film is suggested as an alterative way to pack malodorous items. However, there is no detail about how the film could be formulated or any hint about its structure.

The challenge the present application tackles is to achieve the following film characteristics:
1. Low thickness material for economical production and competitiveness.
2. Odor barrier.
3. Possibility to bond to itself by a slight hand pressure
4. Easy unwinding of the reel.
5. Good mechanical properties to handle consumer abuse during using.

Film Characteristics

We have surprisingly found that all these features can be achieved with a very lightweight multilayer film with a grammage of less than 25 g/m². This is extremely beneficial for the environment as multilayer films are extremely difficult to be produced with so small weight per surface. Prior art films are characterized by a weight per surface ratio of more than 25 g/m² and often of more than 30 g/m².

SUMMARY OF THE INVENTION

The invention is directed to a multilayer film with a weight per surface ratio of less than 25 g/m² used in malodorous item packaging, where the film comprises at least one oxygen barrier material and a layer comprising a self-adhesive material.

The films according to the invention show superior results regarding tensile strength and elongation characteristics. Furthermore, the films according to the invention were comparable in odor testing compared to commercially available films.

DEFINITIONS

In this application the following definitions are used:

The term "film" refers to a flat or tubular flexible structure of thermoplastic material.

The term "heat shrinkable" refers to a film that shrinks at least 10% in at least one of the longitudinal (MD) and transverse (TD) directions when heated at 90° C. for 4 seconds. The shrinkability is measured in water according to ASTM 2732. For temperatures like 100° C. or more, glycerine is used as a reference liquid.

The term "total heat shrinkability" refers to the sum of heat shrinkability at the MD (machine) direction and heat shrinkability at the TD (transverse) direction. In all cases, ASTM 2732 is used for measurement of shrinkabilities.

The term "multilayer" refers to a film comprising 2 or more layers.

The phrase "longitudinal direction" or "machine direction" herein abbreviated "MD" refers to a direction along the length of the film.

The phrase "inner layer" refers to the film layer which comes in immediate contact with the outside environment (atmosphere).

The phrase "outer layer" refers to the film layer that comes in direct contact with the product packed. This is also called "sealing layer" as this layer must be hermetically sealed in order to protect the product from ingress of air.

As used herein, the term "homopolymer" refers to a polymer resulting from polymerization of a single monomer.

As used herein, the term "copolymer" refers to a polymer resulting from polymerization of at least two different polymers.

As used herein, the term "polymer" includes both above types.

As used herein, the term "polyolefin" refers to any polymerized olefin, which can be linear, branched, cyclic, aliphatic, substituted or unsubstituted. More specifically, included in the term polyolefin are homopolymers of olefin, copolymers of olefin, copolymers of an olefin and a non olefinic comonomer (such as ester) etc.

Specific examples include polyethylene homopolymer, polypropylene homopolymer, polybutene homopolymer, ethylene alpha olefin copolymer, propylene alpha olefin copolymer, butene alpha olefin copolymer, ionomer, ethylene ester copolymer etc.

As used herein the term "polyethylene" identifies polymers consisting essentially of the ethylene repeating unit, i.e. more than 50% of it are formed by ethylene repeating units. The ones that have a density more than 0.940 are called high density polyethylene (HDPE), the ones that are have less than 0.940 are low density polyethylene (LDPE).

As used herein the phrase "ethylene alpha olefin copolymer" refers to polymers like linear low density polyethylene (LLDPE), medium density polyethylene (MDPE), very low density polyethylene (VLDPE), ultra low density polyethylene (ULDPE), metallocene catalyzed polymers and polyethylene plastomers and elastomers.

As used herein the term "homogenous ethylene alpha olefin copolymers" refer to ethylene alpha olefin copolymers having a molecular weight distribution less than 2.7 as measured by GPC (gas permeation chromatography). Typical examples of these polymers are AFFINITY® from Dow or EXACT® from Exxon.

As used herein the phrase "styrene polymers" refers to styrene homopolymer such as polystyrene and to styrene copolymers such as styrene-butadiene copolymers, styrene-butadiene-styrene copolymers, styrene-isoprene-styrene copolymers, styrene-ethylene-butadiene-styrene copolymers, ethylene-styrene copolymers and the like.

As used herein the phrase "ethylene methacrylate copolymers" or EMA refers to copolymers of ethylene and methacrylate monomer. The monomer content is less than 40% per mol.

As used herein the phrase "ethylene vinyl acetate copolymer" or EVA refer to copolymers of ethylene and vinyl acetate.

As used herein the phrase "ethylene ester copolymer" includes any polymer made from ethylene and ester monomers. It is obvious that this term includes EVAs, EMAs and other polymers.

As used herein the term "oxygen barrier polymer" refers to polymers which have the property to limit the passage of oxygen through a film or a layer comprising the polymer. Common materials are EVOH, PVDC or polyamide.

As used herein, the term EVOH refers to saponified products of ethylene vinyl ester copolymers. The ethylene content is typically in the range of 25 to 50% per mol. All the later references to EVOH ethylene content will be in % per mol.

As used herein the term PVDC refers to a vinylidene chloride copolymer wherein a major amount of the copolymer comprises vinylidene chloride and a minor amount of the copolymer comprises one or more monomers such as vinyl chloride and/or alkyl acrylates and methacrylates. A major amount is defined as one of more than 50%.

As used herein the term "polyamide" refers to homopolymers and copolymers. Polyamide 6, polyamide 66, polyamide 12, polyamide 6/66, polyamide 6/12, polyamide elastomers, MXD polyamides and other copolymers are specifically useful for the invention.

As used herein the term "polyester" refers to polymers comprising terephthalate units. Examples of polyesters are PET (polyethylene terephthalate), PBT (polybutylene terephthalate), polyester elastomer (block copolymer comprising ester or ether units), PTT (polytrimethylene terephthalate) and other similar polymers.

As used herein, the term "ionomer" comprises the copolymers of ethylene and methacrylic or acrylic acid being metal neutralized. An example of such material is Surlyn from Dupont.

As used herein, the term "polypropylene" refers to polymers incorporating propylene structural units. Examples of these, are homo polypropylenes, random copolymers of propylene and ethylene, block copolymers of propylene and ethylene, copolymers or blends of propylene and rubber (such as blends of polypropylene and ethylene propylene rubber), propylene ethylene alpha olefin terpolymers and others.

The above polymers may be isotactic, syndiotactic or atactic. Isotactic configuration is preferred.

As used herein the term "self-adhesive material" refers to materials that when produced into film form can be bonded to themselves by pressure only without the need to be heated. The bonding level which separates self-adhesive from non self-adhesive materials is 5 g/15 mm when the bonding has been done on a 100×1500 mm film piece with a pressure of 3 bar under ambient conditions and with a contact time of 5 seconds. Values of equal to or more than 5 g/15 mm according to this test show that the material is self-adhesive whereas values of lower than 5 g/15 mm show the film being non self-adhesive.

As used herein the term "substantially non resilient material" refers to materials or material compounds comprising at least 40% per weight inorganics like calcium carbonate, titanium dioxide, wollastonite, mica, glass fibers, dolomite and the like. The rest percentage per weight can be polyethylene, polypropylene, styrene polymer or other thermoplastic material.

As used herein the term "tackifier" refers to low molecular weight materials used to increase the stickiness of the surface of an adhesive. Typical examples are rosins and their derivatives, terpenes and modified terpenes, hydrogenated hydrocarbon resins, C5 aliphatic resins, C9 aromatic resins, C5/C9 resins, terpene/phenol resins and the like.

All measurement methods mentioned herein are readily available for the skilled person. For example, they can be obtained from the American National Standards Institute at: www.webstore.ansi.org.

All percentages are based on weight per weight ratio, except when otherwise stated.

DETAILED DESCRIPTION OF THE INVENTION

According to a first aspect the present invention is directed to a multilayer film with weight per surface ratio of less than 25 g/m$^2$ used in malodorous item packaging, where the film comprises a layer comprising a self-adhesive material and a layer comprising an oxygen barrier material.

According to a further aspect the present invention is directed to a multilayer film with weight per surface ratio of less than 20 g/m$^2$ used in malodorous item packaging, where the film comprises a layer comprising self-adhesive material and a layer comprising an oxygen barrier material.

According to a further aspect the present invention is directed to a multilayer film with weight per surface ratio of less than 15 g/m$^2$ used in malodorous item packaging, where the film comprises a layer comprising self-adhesive material and a layer comprising an oxygen barrier material.

In a further preferred embodiment, the film comprises the construction:
OUTER LAYER/ABUSE LAYER/INTERMEDIATE LAYER/BARRIER LAYER/INTERMEDIATE LAYER/ABUSE LAYER/INNER LAYER In another preferred embodiment, the film comprises the construction:
OUTER LAYER/INTERMEDIATE LAYER/BARRIER LAYER/INTERMEDIATE LAYER/INNER LAYER Detailed description of layers:
Barrier Layer In a preferred embodiment of the invention, the oxygen barrier material is EVOH. The EVOH used preferably has an ethylene content less than 48%, more preferably less than 44%, more preferably less than 38%, more preferably from 27 to 32% ethylene per mol.

In another preferred embodiment, the oxygen barrier material comprises polyamide.

The oxygen barrier material preferably has a weight of less than 3 g/m$^2$, more preferably less than 2 g/m$^2$ and even more preferably less than 1.5 g/m$^2$.

Outer Layer

In a preferred embodiment, the outer layer comprises self-adhesive material.

In a further preferred embodiment, the weight per surface ratio of the outer layer is less than 6 g/m², more preferably less than 5 g/m².

In a preferred version, the self-adhesive material comprises ethylene vinyl acetate copolymer where the vinyl acetate weight ratio is at least 20%, more preferably at least 25% even more preferably at least 25%, even more preferably at least 40%.

In another preferred version the self-adhesive material is a propylene ethylene copolymer where the ethylene content is at least 10% per weight.

In another preferred version the self-adhesive material comprises an ethylene alpha olefin copolymer with density less than 0.9 g/cm³, even more preferably less than 0.880 g/m³. Preferred alpha olefins are butene, hexene or octene.

In another preferred version, the self-adhesive material comprises a maleic anhydrite grafted polyolefin. Examples are maleic anhydrite grafted ethylene vinyl acetate copolymer of linear low density polyethylene.

In another preferred version, the self-adhesive material comprises styrene copolymers with a styrene content of less than 50% per weight. Typical examples are styrene butadiene styrene copolymers, styrene isoprene styrene copolymers, styrene ethylene butadiene copolymers and the like.

In another preferred version, the self-adhesive material comprises ethylene methyl acrylate copolymer with a methyl acrylate content of at least 20% per weight.

In another preferred version, the self-adhesive material comprises ethylene butyl acrylate material with a butyl acrylate content of at least 15% per weight.

In another preferred version, the self-adhesive material comprises poly-isobutylene polymer (PIB) or polybutene copolymer.

In a further preferred version, the self-adhesive material comprises silicone elastomer.

The outer layer may also comprise non self-adhesive materials such as polyolefins (preferably polyethylene homopolymers of copolymers) but not to the extent that the self-adhesive properties are falling below 5 grams/15 mm measured by the method described below.

In another version, the outer layer may comprise tackifiers such as hydrocarbon resins, terpene resins, rosins and the like. Typical examples are Escorez materials from Exxon.

In a further preferred version the outer layer may comprise materials such as "substantially non resilient materials" (SNR). See the above definition of this term.

In a preferred version of the invention, the self-adhesive material in the outer layer is an extrudable material, meaning that it is melt processed by extrusion process.

As defined above, the phrase "outer layer" refers to the film layer that comes in direct contact with the product packed. This is also called "sealing layer" as this layer must be hermetically sealed in order to protect the product from ingress of air.

Inner Layer

Preferred materials for the inner layer include polyolefins, such as low density polyethylene, high density polyethylene, ethylene ester copolymer, ethylene alpha olefin copolymer and polypropylene. Ionomers and styrene copolymers are also possible. Ethylene alpha olefin copolymer is particularly preferred.

According to a further embodiment, the present invention is of the same configuration where inner layer comprises a "substantially non resilient material" (SNR).

In a preferred version of the invention, the SNR material is at least 10 percent, preferably at least 20, preferably at least 30 percent per weight of the inner layer.

In a preferred version the inner layer comprises at least one release agent that is a polymer or chemical substance that allows the surface tension of the inner side to decrease. The reason for this is to allow the easy unwinding of the reel when the inner and the outer side come in contact one to the other.

Intermediate Layers

In the intermediate layers, also called adjacent layers, typical adhesive resins like maleic anhydrite modified polyolefins may be used. Typical examples are BYNEL® from Dupont and OREVAC® from Arkema.

In another preferred version of the invention, polyamide could be used as intermediate layer.

General

The preferred production method for the film is the hot blown film method, which is well known in the art. Other methods like extrusion through flat cast die are also possible.

Additives well known in the art may be used in one or more layers of the present invention. Slip additives, anti-block additives, antifog, polymer processing aids may be used if pertinent. Antimicrobial additives may also be used in one or more of the layers to inhibit the microbe formation. Preferably the antimicrobial is put on the side where the waste is in direct vicinity.

In order to increase the mechanical properties the film may be crosslinked with one of the following methods:

E-beam radiation, gamma radiation, moisture crosslinking using silane grafting compounds, peroxide crosslinking.

The film may be in tubular form or sealed at the edges or single sheet configuration. Centerfold configuration is also possible.

In a preferred version the film tears easily along the transverse direction. Even if the tear is initiated by an operator along the MD, then a further propagation leads the tear along the transverse direction.

EXAMPLES

Example 1

A 5 layer film is produced in a commercial hot blown film line with the following recipe:

| | |
|---|---|
| Inner layer, | 80% EAO1 + 15% SNR1 + 5% ADDITIVES |
| Adjacent layer | 100% ADH 1 |
| Barrier layer | EVOH 1 |
| Adjacent layer | 100% ADH1 |
| Outer layer | Ethylene vinyl acetate copolymer comprising 80% vinyl acetate per weight (= a blend of EVA with 90% vinyl acetate + 10% low density polyethylene) |

See table 1

The thickness of the structure is 5/1.5/1.5/1.5/4 starting from the inner and going to the outer layer.

TABLE 1

| Type | Description | Density g/cm³ |
|---|---|---|
| EAO1 | Ethylene octene copolymer | 0.92 |
| SNR1 | Calcium carbonate compound | 1.6 |

TABLE 1-continued

| Type | Description | Density g/cm³ |
|---|---|---|
| ADH1 | LLDPE mod. Adhesive tie | 0.92 |
| EVOH 1 | EVOH with 32% ethylene | 1.19 |

The weight per surface ratio of the film is 15.2 g/m².

Example 2

A 5 layer film is produced in a hot blown film commercial line with the following recipe

| Inner layer, | 80% EAO1 + 15% SNR1 + 5% ADDITIVES |
| Adjacent layer | 100% ADH 1 |
| Barrier layer | EVOH 1 |
| Adjacent layer | 100% ADH1 |
| Outer layer | Propylene ethylene copolymer |

The thickness of the structure is 5/1.5/1.5/1.5/3 starting from the inner and going to the outer layer.
The weight per surface ratio of the material is 13.2 g/m².

Example 3

A 5 layer film is produced in a commercial hot blown film line with the following recipe

| Inner layer | 80% EAO1 + 15% SNR1 + 5% ADDITIVES |
| Adjacent layer | 100% ADH 1 |
| Barrier layer | EVOH 1 |
| Adjacent layer | 100% ADH1 |
| Outer layer | A blend of 90% ethylene vinyl acetate copolymer comprising 80% vinyl acetate per weight + 10% calcium carbonate polyethylene compound |

See table 1
The thickness of the structure is 5/1.5/1.5/1.5/4 starting from the inner and going to the outer layer.

Example 4

A 5 layer film is produced in a hot blown film commercial line with the following recipe

| Inner layer | 80% EAO1 + 15% SNR1 + 5% ADDITIVES |
| Adjacent layer | 100% ADH 1 |
| Barrier layer | EVOH 1 |
| Adjacent layer | 100% ADH1 |
| Outer layer | Styrene butadiene styrene copolymer |

The thickness of the structure is 5/1.5/1.5/1.5/3 starting from the inner and going to the outer layer.
The weight per surface ratio of the material is 13.2 g/m².

Tests
1. Tensile strength and elongation test is done according to ASTM D 882.
2. Odor test is done in the following way.

Test 1.
Tensile strength and elongation is measured as per ASTM D882.
MD stands for machine direction, whereas TD stands for transverse direction.

| EXAMPLE | TENSILE STRENGTH (MD) | ELONGATION (MD) | TENSILE STRENGTH (TD) | ELONGATION (TD) |
|---|---|---|---|---|
| 1 | 25.5 | 110 | 23.5 | 430 |
| 2 | 27.2 | 104 | 24.3 | 430 |
| 3 | 26 | 160 | 16 | 400 |
| 4 | 22 | 180 | 18 | 505 |

Odor Testing
10 soiled diapers are put in a film of the present invention and also in a commercially sold film. The commercially sold film is believed to be monolayer.
The packs are put in PVDC comprising bags, so the odor cannot escape during the time of the evaluation.
The bags are opened 3 days after the soiling of the diapers and smell was evaluated by a 5 member panel.
The packs made from examples 1-4 were found substantially less smelly than the commercially sold ones.

Adhesive Property Testing
Films of examples 1, 2, 3, 4 were tested as per adhesive property as follows:
Two pieces of dimensions 100×1500 mm film are cut by the operator. Then the operator places them under the jaw of a TOSS sealing machine under temperature 20° C. The pressure of the jaws is 3 bar. Contact (sealing time) of the two pieces of the film is 5 seconds. The self-adhesive side of the first piece is bonded to the self-adhesive side of the second piece.
Then 15 mm stripes are cut either along the MD (machine direction) or along the TD (transverse direction). The adhesive force is measured in an Instron® Instron machine as per the methodology of ASTM D882.
According to this test the self-adhesive force is
Example 1, 15 grams
Example 2, 11 grams
Example 3, 115 grams
Example 4, 80 grams
The above numbers are averages of the measurements along the MD and TD direction. A commercially used film tested as per adhesive property gave practically a self-adhesive force of 0 grams therefore it could not be potentially used in the application.

Tear Test
It was noticed that when a human operator tears the film along the machine direction then a further propagation of the tear follows the transverse direction. This unexpected controlled tear property can be useful in various applications.

The invention claimed is:
1. A multilayer film having a weight per surface ratio of less than 25 g/m² for use in malodorous item packaging, where the film comprises at least an outer layer comprising a self-adhesive material and a layer comprising an oxygen barrier material; where the layer comprising the self-adhesive material is configured to be in direct contact with an item packed in the film when the film is in use for packaging and wherein the self-adhesive material comprises a material selected from the group consisting of an ethylene vinyl acetate copolymer where the vinyl acetate weight ratio is at least 20%, an ethylene vinyl acetate copolymer where the vinyl acetate weight ratio is at least 25%, an ethylene vinyl acetate copolymer where the vinyl acetate weight ratio is at least 30%, an ethylene vinyl acetate copolymer where the vinyl acetate weight ratio is at least 40%, a propylene ethylene copolymer where the ethylene content is at least 10% per weight, styrene copolymers with a styrene content of less than 50% per weight, an ethylene alpha olefin copolymer with a density less than 0.9 g/cm³, a maleic anhydrite grafted polyolefin, an ethylene methyl acrylate copolymer with a methyl acrylate content of at least 20%, an ethylene butyl acrylate material with a butyl acrylate content of at least 15%, a poly-isobutylene polymer (PIB), a polybutene copolymer, a silicone elastomer, and mixtures thereof.

2. The film of claim 1, where the weight per surface ratio of the film is less than 20 g/m².

3. The film of claim 1, where the weight per surface ratio of the film is less than 15 g/m².

4. The film of claim 1, where the film comprises or consists of the structure:
OUTER LAYER/ABUSE LAYER/INTERMEDIATE LAYER/BARRIER LAYER/INTERMEDIATE LAYER/ABUSE LAYER/INNER LAYER.

5. The film of claim 1, where the film comprises or consists of the structure:
OUTER LAYER/INTERMEDIATE LAYER/BARRIER LAYER/INTERMEDIATE LAYER/INNER LAYER.

6. The film of claim 1, where the self-adhesive material comprises ethylene vinyl acetate copolymer, where the vinyl acetate weight ratio is at least 20%.

7. The film of claim 1, where the self-adhesive material comprises ethylene vinyl acetate copolymer, where the vinyl acetate weight ratio is at least 25%.

8. The film of claim 1, where the self-adhesive material comprises ethylene vinyl acetate copolymer, where the vinyl acetate weight ratio is at least 30%.

9. The film of claim 1, where the self-adhesive material comprises ethylene vinyl acetate copolymer, where the vinyl acetate weight ratio is at least 40%.

10. The film of claim 1, where the self-adhesive material comprises a propylene ethylene copolymer where the ethylene content is at least 10% per weight, or
an ethylene alpha olefin copolymer with density less than 0.9 g/cm³, or
a maleic anhydrite grafted polyolefin, or
styrene copolymers with styrene content less than 50% per weight, or
an ethylene methyl acrylate copolymer with a methyl acrylate content of at least 20%, or
an ethylene butyl acrylate material with a butyl acrylate content of at least 15%, or
a poly-isobutylene polymer (PIB) or a polybutene copolymer, or
a silicone elastomer,
or mixtures thereof.

11. The film of claim 10, where the self-adhesive material comprises an ethylene alpha olefin copolymer with a density less than 0.880 g/cm³.

12. The film of claim 1, where the barrier layer comprises EVOH, polyamide or mixtures thereof.

13. The film of claim 1, where the film comprises an inner layer comprising a polyolefin.

14. The film of claim 13, where the inner layer comprises an ethylene alpha olefin copolymer.

15. The film of claim 1, where the film comprises an inner layer comprising a substantially non resilient material.

16. A multilayer film having a weight per surface ratio of less than 25 g/m² for use in malodorous item packaging, where the film comprises at least an outer layer comprising a self-adhesive material; a layer comprising an oxygen barrier material; and an inner layer comprising a substantially non resilient material, wherein the self-adhesive material is selected from the group consisting of an ethylene vinyl acetate copolymer where the vinyl acetate weight ratio is at least 20%, an ethylene vinyl acetate copolymer where the vinyl acetate weight ratio is at least 25%, an ethylene vinyl acetate copolymer where the vinyl acetate weight ratio is at least 30%, an ethylene vinyl acetate copolymer where the vinyl acetate weight ratio is at least 40%, a propylene ethylene copolymer where the ethylene content is at least 10% per weight, and a styrene copolymer with a styrene content of less than 50% per weight.

* * * * *